(12) United States Patent
Harrison et al.

(10) Patent No.: US 7,579,601 B2
(45) Date of Patent: Aug. 25, 2009

(54) SPECTROMETER WITH MOVEABLE DETECTOR ELEMENT

(75) Inventors: Dale A. Harrison, Austin, TX (US); Anthony T. Hayes, Round Rock, TX (US)

(73) Assignee: Metrosol, Inc., Austin, TX (US)

( * ) Notice: Subject to any disclaimer, the term of this patent is extended or adjusted under 35 U.S.C. 154(b) by 0 days.

(21) Appl. No.: 11/711,908

(22) Filed: Feb. 27, 2007

(65) Prior Publication Data

US 2008/0204711 A1 Aug. 28, 2008

(51) Int. Cl.
G01J 1/42 (2006.01)
G01J 3/28 (2006.01)

(52) U.S. Cl. .................. 250/372; 356/326; 356/328

(58) Field of Classification Search ............... 250/372, 250/339.02, 458.1, 459.1, 461.1; 356/451, 356/51, 326, 328
See application file for complete search history.

(56) References Cited

U.S. PATENT DOCUMENTS

| | | | |
|---|---|---|---|
| 3,578,866 A | 5/1971 | Kohler | |
| 4,040,750 A | 8/1977 | Zwiener | |
| 4,810,091 A | 3/1989 | Sullivan | |
| 5,127,728 A | 7/1992 | Warren et al. | |
| 5,260,767 A | 11/1993 | Cook | |
| 5,371,586 A | 12/1994 | Chau | |
| 5,388,909 A | 2/1995 | Johnson et al. | |
| 5,781,290 A | 7/1998 | Bittner et al. | |
| 6,052,401 A | 4/2000 | Wieser et al. | |
| 6,061,129 A | 5/2000 | Ershov et al. | |
| 6,167,290 A * | 12/2000 | Yang et al. | 600/322 |
| 6,265,033 B1 | 7/2001 | Hilliard | |
| 6,288,781 B1 | 9/2001 | Lobb | |
| 6,525,314 B1 | 2/2003 | Jarrell et al. | |
| 6,549,280 B2 | 4/2003 | Riccardo et al. | |
| 6,597,498 B1 | 7/2003 | Schuster | |
| 6,636,305 B2 | 10/2003 | Zhao et al. | |
| 6,744,505 B1 | 6/2004 | Wang et al. | |
| 6,816,258 B2 | 11/2004 | Hutchin | |
| 6,922,240 B2 | 7/2005 | Lerner et al. | |
| 6,943,353 B2 * | 9/2005 | Elmore et al. | 250/339.02 |
| 7,009,702 B2 | 3/2006 | Caruso et al. | |
| 7,106,440 B2 | 9/2006 | Granger | |
| 7,388,646 B2 | 6/2008 | Bassi et al. | |

(Continued)

OTHER PUBLICATIONS

G.W. Rubloff, "Surface Reflectance Spectroscopy System," May 1, 1977, IBM Technical Disclosure Bulletin, vol. 19, No. 12, pp. 4811-4813.*

(Continued)

*Primary Examiner*—David P Porta
*Assistant Examiner*—Faye Boosalis
(74) *Attorney, Agent, or Firm*—O'Keefe, Egan, Peterman & Enders LLP

(57) ABSTRACT

An optical spectroscopy tool is provided. In one embodiment a highly efficient means by which moderate resolution spectroscopy may be performed in the vacuum ultraviolet (VUV) is described. In one embodiment the techniques can be used as a high throughput spectrometer to spatially disperse wavelengths in and around the VUV in such a manner as to generate a substantially flat field focal plane, suitable for use in combination with an array detector. Some embodiments utilize prism based spectrometers. Some embodiments utilize detector elements that may be movable and/or located within the spectrometer. In some embodiments, collimated light may be provided as an input to the spectrometer.

34 Claims, 10 Drawing Sheets

U.S. PATENT DOCUMENTS

| | | | |
|---|---|---|---|
| 7,427,762 | B2 * | 9/2008 | Hyde et al. ............... 250/395 |
| 2002/0030826 | A1 * | 3/2002 | Chalmers et al. ............ 356/630 |
| 2002/0088952 | A1 | 7/2002 | Rao et al. |
| 2004/0150820 | A1 * | 8/2004 | Nikoonahad et al. ........ 356/364 |
| 2005/0157293 | A1 | 7/2005 | Florek et al. |
| 2005/0253080 | A1 | 11/2005 | Janik |
| 2005/0270524 | A1 | 12/2005 | Wang et al. |
| 2006/0038997 | A1 | 2/2006 | Julian et al. |
| 2006/0072109 | A1 * | 4/2006 | Bodkin et al. ............... 356/328 |
| 2006/0082772 | A1 | 4/2006 | Kehoe et al. |

OTHER PUBLICATIONS

McPherson, Prism Spectrometer, Model 303, 1 pg.

McPherson, Prism Predisperser, Model 608, 1 pg.

Moos et al., "Small LiF Prism Spectrometer For Space Applications", Applied Optics, vol. 9, No. 3, Mar. 1970, pp. 601-604.

Rayner et al., "SpeX: A Medium-Resolution 0.8-5.5 Micron Spectrograph and Imager For the Nasa Infrared Telescope Facility", Astronomical Society Of The Pacific, Mar. 2003, pp. 362-382.

Breckinridge et al., "Reflecting Schmidt Imaging Spectrometers", Applied Optics, vol. 22, No. 8, Apr. 15, 1983, pp. 1175-1180.

Rickard, "Hydice: An Airborne System For Hyperspectral Imaging" SPIE, vol. 1937, 1993, pp. 173-179.

Moyssides et al., "A VUV Prism Spectrometer For RICH Radiator Refractometry", Journal Of Modern Optics, vol. 47, No. 10, 2000, pp. 1693-1706.

McCubbin et al., "An Infrared Vacuum Grating-Prism Spectrometer", Applied Optics, vol. 4, No. 6, Jun. 1965, pp. 711-714.

Copending Application, entitled "Prism Spectrometer" filed concurrently herewith, 47 pgs.

Copending Application, entitled "Spectrometer With Collimated Input Light" filed concurrently herewith, 46 pgs.

Samson et al., "Vacuum Ultraviolet Spectroscopy II", 2000, pp. 1-21.

Request for Ex Parte Reexamination Transmittal Form for U.S. Patent 7,067,818, May 30, 2008, 23 pgs.

International Search Report, Metrosol, Inc., Nov. 3, 2008; 2 pgs.

\* cited by examiner

SPECTROMETER WITH MOVEABLE DETECTOR ELEMENT

BACKGROUND

The techniques and systems disclosed herein relate to the field of optical spectroscopy. More specifically, highly efficient means by which moderate resolution spectroscopy may be performed in or below the region of the electromagnetic spectrum referred to as the vacuum ultra-violet (VUV).

Optical spectroscopy techniques have been employed in the characterization of matter for well over a century. While some of the earliest spectroscopic tools employed dispersive prisms to spatially separate wavelengths of light, the vast majority of modern instruments utilize diffraction elements for this purpose. Grating-based systems are generally capable of much higher resolving power and their utilization has become wide spread as a result of significant developments in the production and subsequent replication processes used to manufacture high quality grating elements.

The majority of commonly utilized optical spectroscopic techniques are performed using wavelengths either above the VUV (in the deep ultra-violet, visible or infrared) or below it (in the X-ray region). Of those techniques that employ VUV wavelengths, virtually all of them involve high resolution instrumentation. As compact high brightness sources are not generally available in this energy space, many of these systems are used in conjunction with massive synchrotron radiation sources at national laboratories.

Designing high efficiency spectroscopic instruments for operation in the VUV has proven to be a formidable challenge. Standard reflection gratings are furnished with an evaporated Al coating to enhance their reflectivity. This approach works well over a wide range of wavelengths extending from the deep ultra-violet (DUV) to the near-infrared (NIR). For operation in the VUV, however, it is necessary to protect the aluminum films with a $MgF_2$ overcoat (~250 Å) to prevent oxidation, which can drastically reduce the reflectivity of aluminum at wavelengths lower than 170 nm.

Even with the addition of protective coatings, the normal incidence reflectivity of Al (and most other metals) decreases significantly in the VUV. Consequently, VUV monochromator designs have traditionally incorporated concave gratings in order to eliminate reflective surfaces for efficiency reasons. Notable examples of such single element instruments include devices based upon the Rowland circle and Seya-Namoika mounts (see Masato Koike, "Normal-Incidence Monochromators and Spectrometers", in *Vacuum Ultraviolet Spectroscopy* (J. A. R. Samson and D. L. Ederer, ed.), Vol. II, pp. 1-20. Academic Press, San Diego, 2000). A common drawback of these simple designs is the presence of astigmatism which results in a loss of intensity and spatial resolution in the direction parallel to the entrance slit. More importantly, while finely ruled gratings can achieve high spectral resolution their VUV efficiency profiles are generally quite low and routinely exhibit complicated wavelength dependencies.

To overcome the diminished normal incidence reflectivity of metals in the VUV, spectroscopy systems based on grazing incidence grating mounts have been employed in some circumstances. Unfortunately, such systems typically are designed for use in large scale, high-resolution, beam-line experiments and as such, incorporate optical elements (gratings and mirrors) ill-suited for incorporation into small footprint commercial instruments. For example, such systems may have a very large angle of incidence relative to the grating normal. The angle of incidence and very long focal lengths (on the order of 100 cm) do not lend themselves to integration in small footprint systems.

In situations where resolution requirements are modest there would be benefit in designing a compact VUV spectroscopic instrument which overcomes the abovementioned shortcomings by employing an optical element that separates, spreads or disperses light into spatially separate wavelengths in a compact spectrometer system.

A number of prism-based VUV monochromators have been designed specifically for scientific research applications. See for example H. W. Moos et. al., Appl. Opt. 9, 601 (1970) and P. G. Moyssides, et. al., J. Mod. Opt. 47, 1693 (2000). These instruments employ dispersive prisms mounted on rotation stages, along with exit slits and single element detectors to provide wavelength scanning capabilities.

A select number of prism-based instruments have been designed to operate in conjunction with multi-element array detectors, so as to enable the simultaneous collection of multiple wavelengths. One such instrument, built for the Naval Research Laboratory, is described by L. Rickard, et al. in Proceedings of SPIE 1937, 173 (1993). A second such instrument, built for NASA, is described by J. T. Rayner et al., in Publications of the Astronomical Society of the Pacific 115, 262 (2003). Warren et al. in U.S. Pat. No. 5,127,728 also discloses a prism spectrometer designed for use in combination with multi-element array detectors. Also in the prior art, Wang et al. in U.S. Pat. No. 6,744,505 discloses an imaging spectrometer for use in general spectroscopic applications where the wavelength dispersive element is a prism.

SUMMARY OF THE INVENTION

The disclosure herein relate to the field of optical spectroscopy. In one embodiment a highly efficient means by which moderate resolution spectroscopy may be performed in the vacuum ultraviolet (VUV) is described. In one embodiment the techniques can be used as a high throughput spectrometer to spatially disperse wavelengths in and around the VUV in such a manner as to generate a substantially flat field focal plane, suitable for use in combination with an array detector. Some embodiments utilize prism based spectrometers. Some embodiments utilize detector elements that may be movable and/or located within the spectrometer. In some embodiments, collimated light may be provided as an input to the spectrometer. The various embodiments disclosed herein may be used alone or combination with other embodiments disclosed herein.

In one embodiment, a spectrometer is provided. The spectrometer may include at least one prism which receives collimated light and disperses the collimated light as multiple spatially separated wavelengths of light, the at least one prism employed in a single pass configuration. The spectrometer may further include a first optic which receives the collimated light from the prism and focuses it onto a focal plane and an array detector positioned at the focal plane that simultaneously collects the multiple spatially separated wavelengths of light.

In another embodiment, a reflectometer for processing light wavelengths including at least wavelengths below deep UV wavelengths is disclosed. The reflectometer may include a light source that generates light wavelengths including at least wavelengths below deep UV wavelengths and a spectrometer for receiving the light that is generated from the light source and reflected from a sample. The spectrometer may comprise at least one prism which receives collimated light and disperses the collimated light as multiple spatially separated wavelengths of light. The spectrometer of the reflectometer may further include a first optic which receives the collimated light from the prism and focuses it onto a focal plane and an array detector positioned at the focal plane that simultaneously collects the multiple spatially separated wavelengths of light.

A method of analyzing light through spectroscopy techniques is also disclosed. The method may include providing light that is in the vacuum ultra violet (VUV) wavelength range or lower within an environmentally controlled chamber, dispersing the light with a prism, and receiving multiple spatially separated wavelengths of the dispersed light with a detector array.

In yet another embodiment, a spectrometer is disclosed that may include an entrance port configured to receive light from a light source that is external to the spectrometer, the entrance port receiving collimated light. The spectrometer may further include at least one optical element which receives light from the light source after it passes through the entrance port, the light received by the at least one optical element being collimated, the optical element separating the received collimated light into multiple spatially separated wavelengths of light. Further, the spectrometer may include an array detector positioned to simultaneously collect the multiple spatially separated wavelengths of light.

In another embodiment, a spectrometer is provided. This spectrometer may include a collimated light entrance aperture receiving input collimated light provided to the spectrometer to provide light for a light path within the spectrometer, the input collimated light includes wavelengths below deep UV wavelengths of light. The spectrometer may further include an optical element that spreads light within the light path, and a detector receiving the spread light.

Another method is provided for improving the alignment tolerance between a spectrometer and an optical system providing input light to the spectrometer. This method may comprise coupling the spectrometer to the optical system and providing collimated light from the optical system to the spectrometer as spectrometer input light so as to provide greater alignment tolerance between the light path of the collimated light and the spectrometer.

In still another embodiment, a spectrometer is provided. The spectrometer may include at least one optical element which receives light and separates the light such that different wavelengths of the light are spatially separated. The spectrometer may further include an array detector within a controlled environment and positioned at a focal plane of the different spatially separated wavelengths of light so as to detect the different spatially separated wavelengths of light, the array detector being adjustable to facilitate alignment of the array detector with respect to the focal plane.

Yet another embodiment also relates to a spectrometer. The spectrometer may include a light path that includes at least one optical element and an adjustable array detector positioned at a focal plane of the light path. The adjustable array detector may be located at a point in the light path that is subsequent to the at least one optical element, the adjustable array detector detecting light provided at the focal plane. The array detector may further be adjustable to facilitate alignment of the array detector with respect to the focal plane. The spectrometer may also include an enclosed volume within the spectrometer, the enclosed volume fully surrounding the adjustable array detector.

In another embodiment, a spectrometer for processing wavelengths of light that includes wavelengths below deep UV wavelengths is provided. The spectrometer may include at least one optical element which receives light which includes wavelengths below deep UV wavelengths, the optical element spreading the light as multiple spatially separated wavelengths of light. The spectrometer may further include an adjustable array detector that receives the multiple spatially separated wavelengths of light, the adjustable array detector being movable so that the adjustable array detector may be aligned with respect to the multiple spatially separated wavelengths of light.

In yet another method embodiment, a method of operating a spectrometer so that an array detector may be aligned with respect to a light path within the spectrometer is disclosed. The method may comprise providing an interior space within the spectrometer, the light path being at least in part within the interior space. The interior space may be sufficiently environmentally controlled to allow for the transmission and detection of wavelengths of light that include at least in part wavelengths below deep UV wavelengths. The method may further include adjusting the position of the array detector with respect to the light path, wherein the adjustment of the position of the light path does not alter a volume of the space.

A further understanding of the nature of the advantages of the present invention may be realized following review of the following descriptions and associated drawings.

BRIEF DESCRIPTION OF THE DRAWINGS

A more complete understanding of the present invention and advantages thereof may be acquired by referring to the following description taken in conjunction with the accompanying drawings, in which like reference numbers indicate like features. It is to be noted, however, that the accompanying drawings illustrate only exemplary embodiments of the invention and are therefore not to be considered limiting of its scope, for the invention may admit to other equally effective embodiments.

DESCRIPTION OF THE PREFERRED EMBODIMENTS

Figure 1:
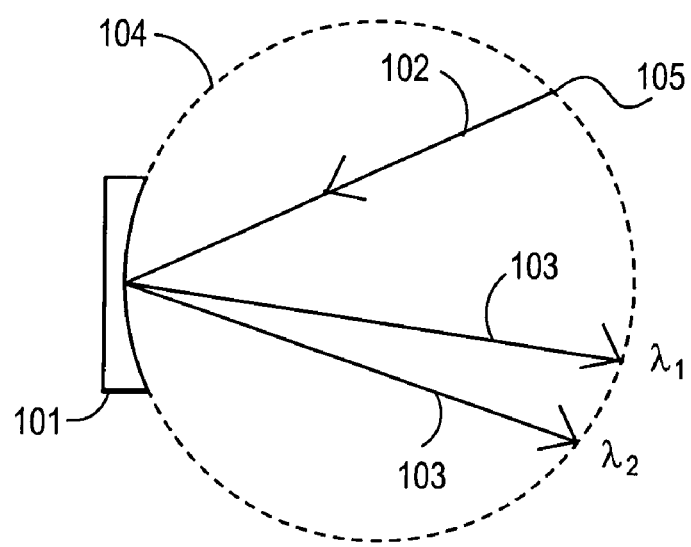
FIG. 1—(Prior Art)—Schematic representation of Rowland Circle spectrograph.

To enhance the sensitivity of optical metrology equipment for challenging applications it is desirable to extend the range of wavelengths over which such measurements are performed. Specifically, it is advantageous to utilize shorter wavelength (higher energy) photons extending into, and beyond, the region of the electromagnetic spectrum referred to as the vacuum ultra-violet (VUV). Vacuum ultra-violet (VUV) wavelengths are generally considered to be wavelengths less than deep ultra-violet (DUV) wavelengths, i.e. less than about 190 nm. While there is no universal cutoff for the bottom end of the VUV range, some in the field may consider VUV to terminate and an extreme ultra-violet (EUV) range to begin (for example some may define wavelengths less than 100 nm as EUV). Though the principles described herein may be applicable to wavelengths above 100 nm, such principles are generally also applicable to wavelengths below 100 nm. Thus, as used herein it will be recognized that the term VUV is meant to indicate wavelengths generally less than about 190 nm however VUV is not meant to exclude lower wavelengths. Thus as described herein VUV is generally meant to encompass wavelengths generally less than about 190 nm without a low end wavelength exclusion. Furthermore, low end VUV may be construed generally as wavelengths below about 140 nm.

Generally it is desirable to avoid complicated optical systems in the vacuum ultra-violet since efficient reflectors and suitable compound lenses (capable of transmitting VUV wavelengths) are typically not available. Furthermore, optical surfaces are prone to developing thin layers of contaminates characterized by high VUV absorption cross-sections, which may significantly degrade their performance at these wavelengths. As a result, optical surfaces in VUV instruments should be monitored (and cleaned if necessary) to ensure stable and reliable performance. A means for achieving this objective is disclosed in U.S. application Ser. No. 11/600,414 filed Nov. 16, 2006, the disclosure of which is expressly incorporated herein by reference. Consequently, it may be desirable to employ simple optical designs (with a minimum number of surfaces) in order to maintain high optical throughput when operating in this spectral region, as opposed to the use of double-pass prism configurations.

Further, it would be of benefit in one aspect to provide a simple prism-based VUV spectrometer capable of spatially separating wavelengths in such a manner as to facilitate their simultaneous collection by rendering a substantially flat field focal plane, suitable for use in conjunction with a multi-element detector.

In many spectroscopic applications the line widths of features of interest remain constant over the spectral measurement range. That is to say that the resolution requirements of the measurement remain constant as a function of wavelength. As a consequence, spectrometers are often designed so as to deliver output spectra exhibiting linear spatial dispersion properties (i.e. wherein the variation of wavelength with position in the detector plane is linear in nature). To first order, grating based instruments largely accomplish this goal. With prism based instruments, where spatial dispersion properties often change non-linearly in the detector plane, prism doublets (comprised of two prisms constructed of different materials) are often employed in an effort to the improve the linearity.

However, for certain spectroscopic applications in the VUV the resolution requirements of the measurement may vary as a function of wavelength. For example, the reflectance and/or transmittance spectrum associated with a thin semi-transparent film may exhibit interference fringes whose periods decrease quite dramatically with wavelength. This behavior is a consequence of the increase in refractive index of the film at shorter wavelengths, resulting in a corresponding increase in the optical path length experienced by photons traversing the film. As the refractive indices of many common materials are known to behave in a similar manner, it follows that that there would be benefit in designing a VUV spectrometer whose output spectra exhibit spatial dispersion properties more closely matched with the resolution requirements of the application than those of conventional instruments.

A typical VUV grating spectrograph as known in the prior art is presented in FIG. 1. This simple instrument, based on the Rowland circle mount, employs a concave grating 101. The grating is illuminated via light 102 from an entrance slit 105, which is diffracted and focused onto a curved focal surface to generate a spectrum 103. Both the entrance slit and the diffracted spectrum lie on the Rowland circle 104. When employed in conjunction with an exit slit, single element detector and grating rotation mechanism, such a system is capable of achieving very high spectral resolution. However, as a consequence of the curved focal plane this design does not lend itself to applications wherein the simultaneous collection of multiple wavelengths is desired.

A further shortcoming of the prior art VUV grating spectrometer relates to its poor optical throughput. Gratings diffract light into multiple orders thereby reducing the intensity of light reaching the detector at any given wavelength. Commercially available VUV gratings for normal-incidence mounts typically exhibit very low optical efficiencies (<5% at 120 nm) which can vary considerably as a function of wavelength.

Grazing incidence VUV spectrometers based upon aberration corrected gratings are routinely used in beam line experiments. Many of these instruments are capable of generating flat focal fields to accommodate multi-channel detectors. Unfortunately, these instruments are almost exclusively designed with long focal lengths, thus precluding their integration into compact measurement system designs.

Generally speaking, high efficiency, moderate resolution diffraction gratings for use in compact VUV spectrometers are typically not available. It follows that there would be benefit in designing a VUV spectrometer based upon a dispersive element offering higher efficiency in this spectral region or lower wavelengths. Such an instrument would offer a flatter efficiency profile and would avoid the order-sorting issues associated with grating based systems.

Figure 2:
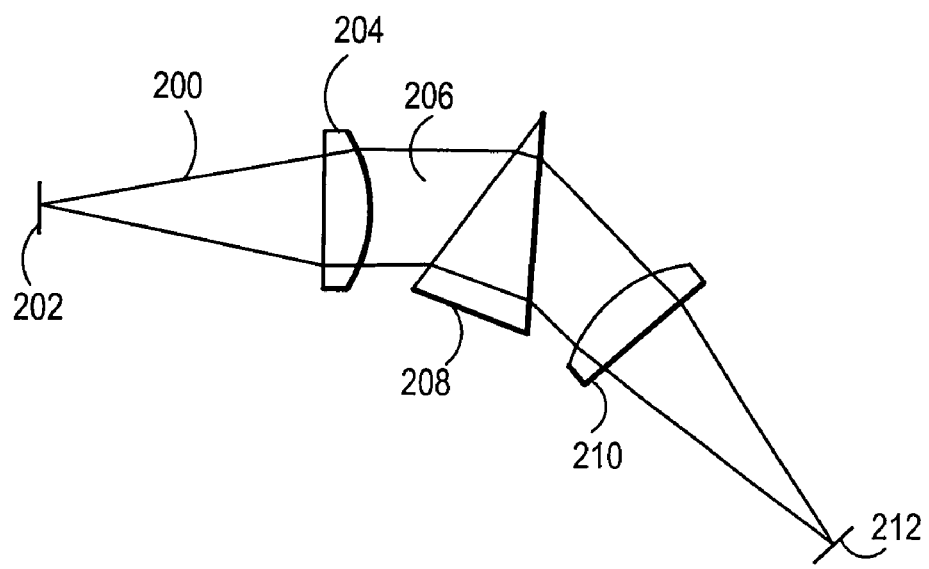
FIG. 2—(Prior Art)—Schematic representation of prism spectrometer.

A typical dispersive prism monochromator as known in the prior art is presented in FIG. 2. In addition to providing a higher, more uniform optical efficiency than its grating-based counterpart, such an instrument may present the further advantage of avoiding spectral contamination issues inherently associated with the use of diffraction gratings. In operation, light 200 passes through an entrance slit 202 and is collimated by a first lens 204. The collimated beam 206 then passes through a dispersive prism 208 which acts to separate the constituent wavelengths in the incident beam. The individual wavelengths exit the prism 208 at slightly different angles, determined by the wavelength dependence of the refractive index of the material comprising the prism. Light exiting the prism is collected by a second lens 210 which acts to focus it onto a detector 212. While not explicitly shown in the figure, the focal plane of the instrument is also curved, thereby limiting the usefulness of the system in applications where multiple wavelengths are to be simultaneously recorded.

A further shortcoming of the system of FIG. 2 relates to its use of lenses for collimating and focusing the light delivered to and received from the dispersive prism. Single element lenses inherently introduce chromatic aberrations in optical systems which can limit performance. At longer wavelengths commercially available compound lenses are widely available and can be used to minimize these effects. Unfortunately, these highly-corrected elements can not be used in the VUV as they do not transmit short wavelength photons. Consequently, reflective optical designs based on mirrors, rather than lenses, are generally employed.

Optical design considerations in the VUV are further complicated by thin layers of contaminates which naturally form on virtually all optical surfaces. These contaminants may be highly absorbing in the VUV and can have a large effect on optical throughput. This phenomenon in combination with the reduced efficiencies exhibited by most reflectors in the VUV necessitates system designs employing a minimum number of optical surfaces. As a result, complex optical arrangements successfully employed at longer wavelengths cannot be simply modified for use in the VUV. As a consequence, prism spectrometers based on double pass configurations sometimes are ill-suited for use in the VUV. As described in more detail below, a spectrometer is provided in FIG. 3 that utilizes a single pass prism configuration. In such a configuration the light passes through the main body of the prism in a single pass as opposed to multi-pass configurations in which the light passes two or more times through the main body of the prism. Thus, as shown in FIG. 3 light passes from an entrance surface of the prism to an exit surface of the prism without making multiple passes through the prism.

VUV radiation is strongly absorbed by both oxygen and moisture. It follows that the concentration of such species must be maintained at sufficiently low levels so as to permit the transmission of VUV or lower wavelengths in VUV optical instruments. This may be accomplished by employing some combination of vacuum, purge or backfill methodologies in combination with a leak-tight enclosure in which to house the optical elements of the system. Where purge or backfill techniques are utilized a high-purity non-absorbing (at least over the wavelength region of interest) gas like nitrogen, argon or helium may be used.

Figure 3:
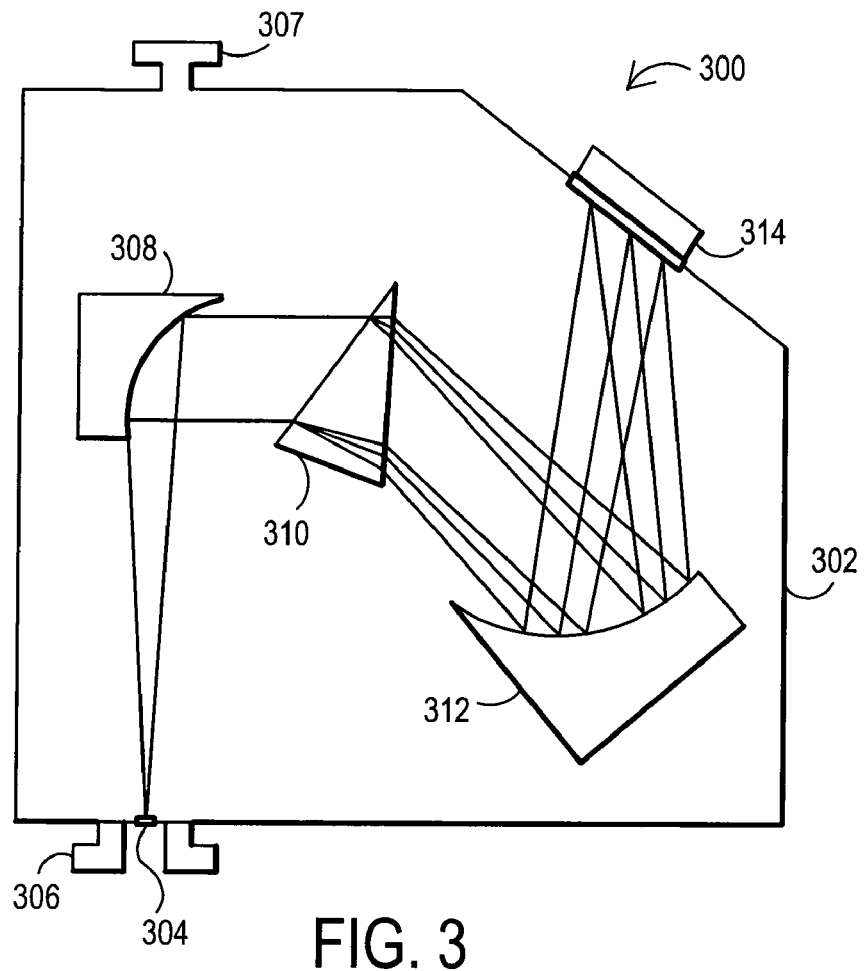
FIG. 3—Schematic representation of VUV prism spectrometer.

A schematic representation of a highly efficient, compact spectrometer 300 that overcomes the shortcomings of prior art designs and is suitable for operation in the VUV is presented in FIG. 3. The spectrometer of FIG. 3 employs an optical element that separates, spreads or disperses light into spatially separate wavelengths in a compact spectrometer system. As shown in FIG. 3, the optical element that separates, spreads or disperses light into multiple spatially separate wavelengths is a prism 310. Though prism dispersion effects are utilized in FIG. 3, it will be seen that with regard to other embodiments provided herein the separating, spreading or dispersing of light into multiple spatially separate wavelengths may also be accomplished by utilizing the diffracting properties of a diffraction grating.

As is evident in FIG. 3, the majority of the system components are housed in an environmentally controlled chamber 302. Light is coupled into the instrument through an entrance aperture 304. The aperture 304 may be recessed in a vacuum compatible assembly 306 which facilitates coupling of the spectrometer to another environmentally controlled volume in a leak tight manner. While gases could in principle be exchanged through the entrance aperture assembly, the chamber may also be equipped with a dedicated gas handling interface 307 to facilitate this activity. The gas handling interface 307 also provides an efficient mechanism for evacuating and/or backfilling the controlled environment in a timely fashion. The chamber may also be equipped with an optional purge valve (not shown) if operation under the continuous flow of a non-absorbing purge gas is desired.

Light entering the instrument is collected and collimated by a reflective optic 308. The collimating optic 308 limits the f-number or optical speed of the instrument and works in combination with the focusing optic 312 to define the resolution of the tool. In one embodiment of the instrument, the collimating optic is an off-axis parabolic reflector with a $MgF_2$/Al overcoat optimized for operation in the VUV. In a particularly useful embodiment of the invention the collimating optic 308 is a fast (f/2) off-axis parabolic mirror designed such that the off-axis or turning angle is 90°. Such a configuration simplifies coupling of the spectrometer with an external optical system as the physical separation between the entrance aperture and the dispersing prism is increased relative to smaller angle configurations. This consideration may be of importance in situations wherein fast (i.e. low f-number) optical designs are employed.

Light from the collimating optic 308 is incident on the front face of the dispersing prism 310. The prism material may be selected such that it transmits VUV photons. A particularly well-suited material is LiF as it exhibits one of the shortest transmission cut-off wavelengths and is not birefringent. Alternate prism materials with longer transmission cut-off wavelengths may include $MgF_2$, $CaF_2$, $SrF_2$, $BaF_2$, LaF, fluorine-doped fused silica, fused silica, quartz or other materials.

Light passing through the prism 310 is deviated. The angle of deviation is a function of wavelength and depends on the geometry of the prism, the angle of incidence and the refractive index of the prism material. In this manner, light of different wavelengths is caused to exit the prism at different angles. While there are reflection and transmission losses associated with use of dispersive prisms, these elements are often more light efficient than diffraction gratings, particularly in the VUV. Additionally, prisms have considerably less surface area than gratings, resulting in reduced scattering and lower stray light generation. This characteristic may be particularly important at vacuum ultra-violet wavelengths where scattering cross sections often increase significantly.

Light exiting the prism is collected and focused onto the detector 314 by a focusing optic 312. In one embodiment the focusing optic is also an off-axis parabolic reflector with a $MgF_2$/Al overcoat optimized for operation in the VUV. In one embodiment the off-axis parabolic mirror may be designed such that the off-axis or turning angle is approximately 60°. While use of smaller off-axis angles may improve imaging performance, they may also complicate detector integration as the physical separation between detector element and dispersing prism is reduced.

In one embodiment, the focusing optic 312 is selected and configured such that the detector focal plane is located outside the boundaries of the spectrometer housing so as to facilitate simple integration with commercially available detectors systems. The detector system (i.e. detector element and control electronics) generally is connected to a computer (not shown) which receives the measured spectrum.

While any number of VUV sensitive detectors could be used in conjunction the instrument, array detectors which provide efficient detection of VUV photons while offering a wide dynamic range are preferred. In this regard back-thinned, back-illuminated CCD detectors are particularly well-suited. Phosphorus-coated front-illuminated charge-coupled devices (CCD's) may also be used; however the coatings (used to down-convert higher energy photons which would normally be absorbed in poly-Si gate regions) reduce the efficiency of the devices by at least a factor of two. Alternatively, micro channel plates (MCP) may also be used in combination with conventional longer wavelength detectors.

Figure 4:
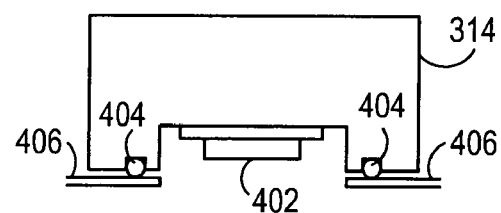
FIG. 4—Detector configured to share controlled environment with spectrometer chamber.

To help enable operation in the VUV it is desirable that the detector element be mounted in an environment free of absorbing species like oxygen and water. This may be readily accomplished by mounting the detector such that its active surface which forms the detector element or array 402 shares a common environment with the volume of the VUV spectrometer as depicted in FIG. 4. As illustrated in the figure the detector 314 forms a leak-tight connection against the outside surface 406 of the spectrometer chamber via a sealing mechanism 404. In this manner at least the detector element or array 402 of the detector resides inside the shared volume of the spectrometer and is connected to its associated control circuitry (located outside the shared volume) through a vacuum feed-through socket. Outgassing and contamination concerns generally discourage mounting the control circuitry inside the controlled environment.

Figure 5:
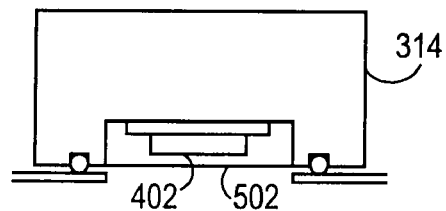
FIG. 5—Detector configured with separate controlled environment.

In an alternate embodiment, the detector may be mounted in a separate controlled environment so that detector element or array 402 interfaces with the spectrometer volume via a protective VUV-transmissive window 502 as shown in FIG. 5. In situations where detector cooling is employed, the additional window may provide protection against unintentional exposure to moisture which could damage the detector. Unfortunately, the additional window may also introduce ghosting effects caused by back reflections. In certain configurations the ghosting effects can be quite significant since intense signals at longer wavelengths may reflect from the surface of detector, reflect off the backside of the window and strike the detector again at locations corresponding to shorter wavelengths (where the corresponding intensity could be much lower) leading to erroneous results.

As noted above, the spectrometer of FIGS. 3-5 has the detector 314 fixedly mounted to an exterior wall of the spectrometer. In such a configuration the precise alignment of the detector 314 and the light path may be desirable. In order to provide greater ease of alignment of the detector it may be desirable to have the detector be moveable with reference to the light path. In one exemplary embodiment, the detector element or array may be movably mounted such that the detector element (such as a detector array) may be adjusted relative to the light path.

One embodiment for moveably mounting the detector element may comprise mounting the detector element in a movable fashion within the volume of the spectrometer. It may be desirable to provide such a mounting in a fashion such that the detector element is separated from at least some of the other components of the detector. For example, some detector components such as electronic circuitry and boards may not be vacuum compatible. In addition, although the detector element may be relatively small, the other components of commercially available detectors are often relatively large. Larger size components may cause complications in that the components may block other sections of the light path when small angles of incidence are utilized.

Figure 6:
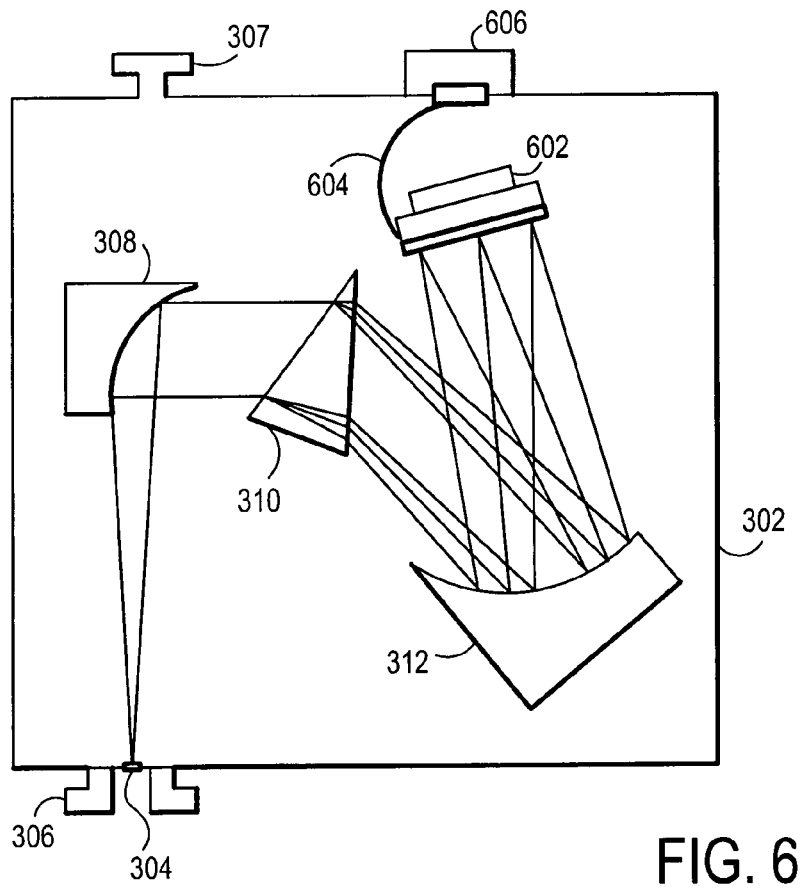
FIG. 6—Schematic representation of VUV prism spectrometer with detector separated from associated control electronics.

FIG. 6 presents one exemplary configuration wherein the detector element 602 is internally mounted within the environmentally controlled chamber 302. As is evident in the figure, the detector element 602 is physically separated from its associated control electronics 606 through use of a vacuum compatible cable assembly 604 and electrical feed through configuration (it is noted that the detector element 602 and control electronics 606 are not necessarily drawn to scale and often the detector electronics may be relatively larger than the detector element). The detector element 602 can be mounted on an adjustment mechanism so as to facilitate precise alignment with the focal plane of the focusing optic. Separating the detector element mount from the sidewall of the spectrometer housing thus greatly simplifies the instrument alignment process. A further benefit of this configuration is that it allows the detector element to be located much closer to the dispersing prism, thereby reducing the off-axis angle of the focusing optic. As a result, much improved imaging properties may be achieved. Thus, as shown in FIG. 6 a position adjustable detector element is provided. Further, the position adjustable detector element is separated from at least some of the other detector components.

The detector element 602, associated control electronics 606, and vacuum compatible cable assembly 604 may be constructed in a wide range of manners from a wide range of parts. In one exemplary embodiment a windowless back-thinned CCD area image sensor from Hamamatsu of Japan (model S7030) may be utilized for the detector element 602. Such a detector has dimensions of 24.576 mm (H)×1.392 mm (V) and has 1024 (H)×58 (V) pixels. Hamamatsu manufactures a wide variety of other suitable detectors. E2V of the UK also manufactures similar detector products and other detectors may be obtained from other vendors. The image sensor may be plugged into a socket constructed of a vacuum compatible material such as PEEK (a polyetheretherketone) for example. The socket may be held in a kinematic optics mount which enables adjustment of both translation and tilt. The pins on the socket may be connected to the vacuum compatible cable assembly 604. The conductors in the cable may be, for example, constructed with silver plated copper wire. The insulation may be a non-shrinking FEP extruded Teflon that is applied and heat treated to minimize trapped gases. The cable assemble 604 is then connected to a vacuum compatible electrical feed through which provides external (i.e. outside the controlled enclosure) connections for each of the wires in the cable. The connections on the outside are routed (via shielded cable) to the electronics of the control electronics 606. The components of the control electronics 606 (sensor preamplifier, front end electronics, interface electronics, etc.) may be purchased from a variety of vendors including for example tec5 AG of Germany. Suitable control electronics are also manufactured by Spectronic Devices Ltd. of the UK and other vendors.

The imaging performance of the instrument can be further improved by replacing the off-axis focusing optic with an aberration-corrected custom toroidal optic. This may lead to improved imaging performance in the vertical direction of the detector plane (i.e. along the height of the detector), thereby enabling detectors with smaller heights to be employed without compromising signal collection efficiencies.

Figure 7:
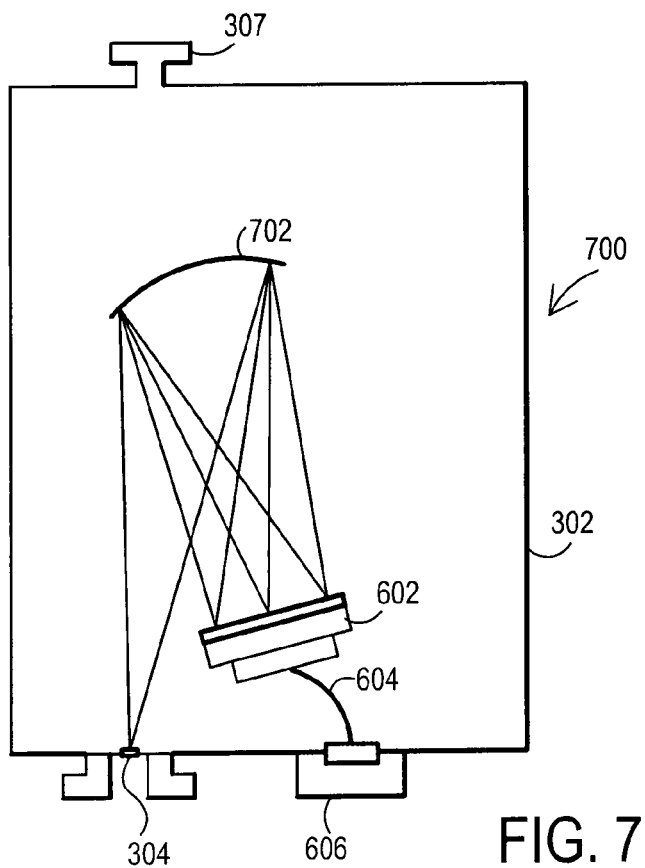
FIG. 7—Schematic representation of VUV aberration-corrected grating spectrometer with internally-mounted detector.

The benefits associated with internal detector mounting may also be realized in conjunction with VUV grating spectrometer designs. As illustrated in FIG. 7, an aberration-corrected flat-field imaging grating element 702 may be combined with an entrance aperture and internally mounted detector element 602 to produce a compact VUV spectrometer 700. Similar to FIG. 6, the detector element 602 is coupled to its associated control electronics 606 through use of a vacuum compatible cable assembly 604. This instrument could be expected to outperform conventional grating spectrometers as a result of its improved imaging performance and the ability to precisely align the detector element. While such an instrument may not be expected to provide the throughput achievable from its prism counterpart, it could be advantageous when operating at wavelengths below the lowest transmission wavelengths that can be achieved using prism instruments. It is noted that with regard to FIG. 7 a grating based system with a near normal angle of incidence of light with respect to the grating normal may be utilized. For example, an angle of incidence of approximately less than 30 degrees, and more preferably less than 20 degrees may be utilized. The use of a segregated detector allows the detector element 602 to be placed within the volume of the spectrometer even when used with such near normal angles as the smaller detector element 602 does not interfere with the transmission of light from the aperture 304 to the grating 702. Thus, in one embodiment an angle of incidence of approximately 10 degrees may be utilized in the instrument of FIG. 7.

Figure 8:
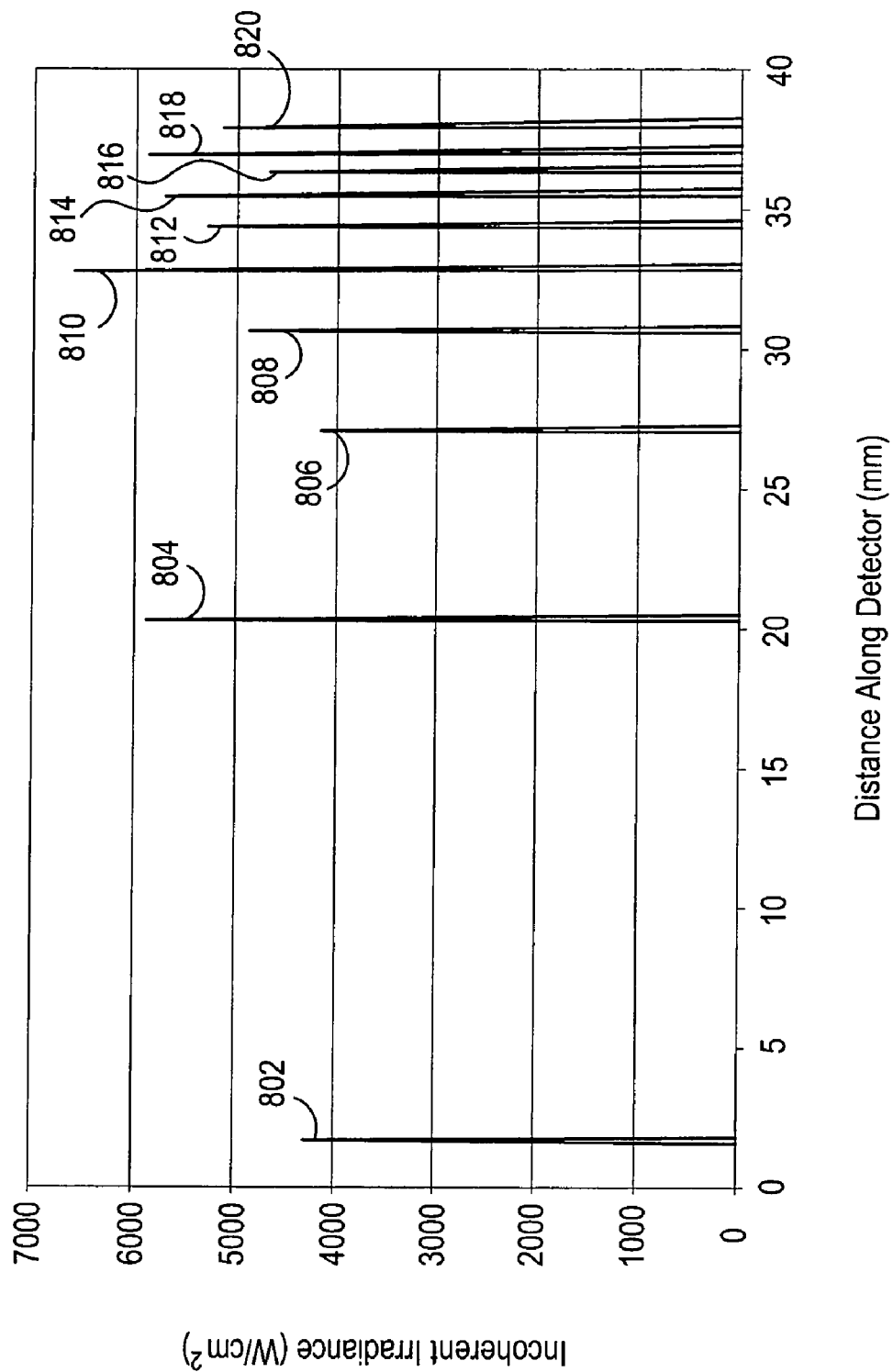
FIG. 8—Integrated irradiance received by the detector for 10 discrete wavelengths corresponding to 120 nm (left), 130 nm, 140 nm, 150 nm, 160 nm, 170 nm, 180 nm, 190 nm, 200 nm and 220 nm (right).

An example of the representative performance achievable with a system like that depicted in FIG. 6 is presented in FIG. 8, wherein the integrated irradiance as a function of position along the width of the detector is presented for 10 discrete wavelengths ranging from 120 nm to 220 nm (plot 802 corresponding to 120 nm, plot 804 corresponding to 130 nm, plot 806 corresponding to 140 nm, plot 808 corresponding to 150 nm, plot 810 corresponding to 160 nm, plot 812 corresponding to 170 nm, plot 814 corresponding to 180 nm, plot 816 corresponding to 190 nm, plot 818 corresponding to 200 nm, plot 820 corresponding to 220 nm). Integration was performed as a function of detector height (i.e. in a direction perpendicular to that in which the wavelengths are spatially separated). As is evident from the figure the peaks associated with individual wavelengths are well resolved across the width of the detector. The results in the figure were achieved using a detector with a width of 40 mm and a height of 6.7 mm, in combination with a 25 µm square entrance aperture. It will be clear to one skilled in the art that alternate embodiments of the invention may be configured so as to facilitate integration with other detector geometries. For example, other embodiments may employ detectors with widths ranging from as little as 1 mm to as long as 1 cm in length. As mentioned, other geometries may also be utilized and many suitable array detectors are commercially available from companies like e2V of the United Kingdom and Hamamatsu of Japan.

To help ensure accurate results are obtained it may be desirable to minimize so called "stray light" effects. In a general sense, stray light may be light which impinges upon the detector at a specific position (i.e. which is in turn associated with a specific wavelength), that is not of the specific wavelength. Typically this light is polychromatic and results from scattering processes. The conventional approach to reducing stray light is to insert light baffles (i.e. beam stops) in judicious locations within the instrument to prevent scattered light from reaching the detector. While not explicitly shown in the schematic representations of this disclosure it assumed that suitable baffles may be incorporated into the described embodiments. Determination of optimum beam stop placement is greatly aided through use of commercially available ray-trace software packages, well known to those skilled in the art.

Figure 9:
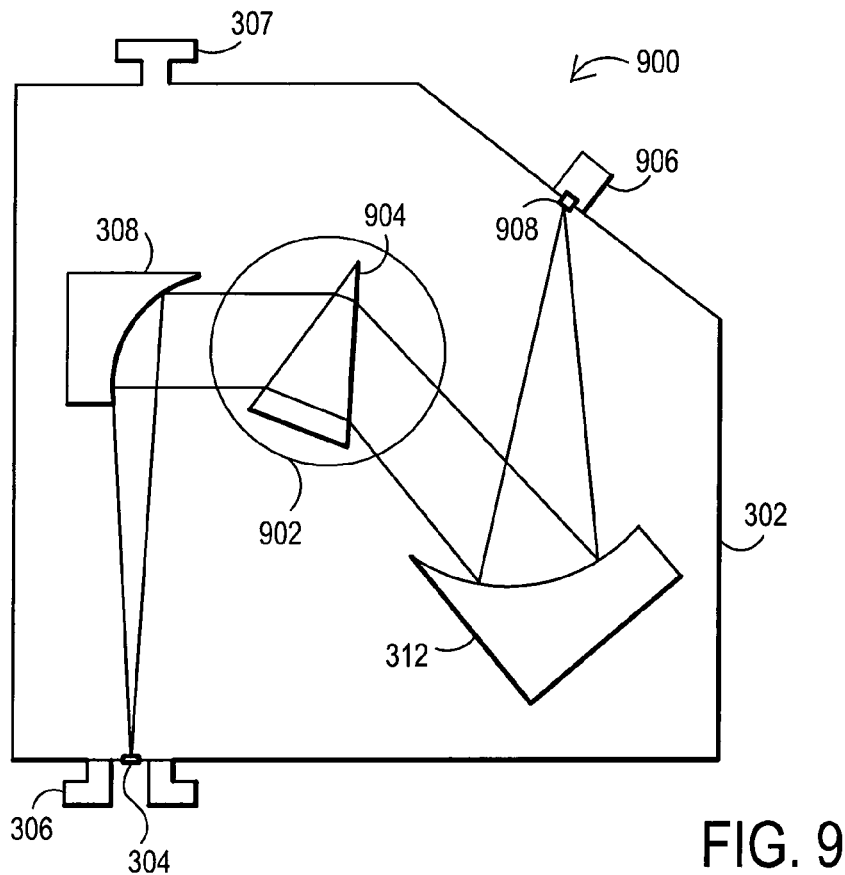
FIG. 9—VUV monochromator with rotation stage, exit slit and single element detector.

While some embodiments described herein provide a VUV spectrometer capable of rendering a flat field image plane suitable for use in conjunction with a multi-element detector for the simultaneous collection of data at multiple wavelengths, it will be recognized by one skilled in the art that this instrument may be used advantageously in other applications. For example, if the array detector is replaced with an exit slit and appropriate sealing mechanism, the instrument described herein may also be used as an efficient VUV pre-monochromator. Also, if the instrument was further modified such that the prism was mounted on a rotating stage and the sealing mechanism containing the exit slit was equipped with a VUV-sensitive single element detector (like a photomultiplier tube), the instrument could be advantageously used as a scanning monochromator. An example of this alternate embodiment is provided in FIG. 9. Thus, for example, as shown in FIG. 9 a scanning monochromator 900 is provided with a structure somewhat similar to that described with respect to the spectrometer of FIG. 3 however a prism 904 is mounted on a rotating stage 902. Further, a single element detector 906 is provided at an exit slit 908.

Figure 10:
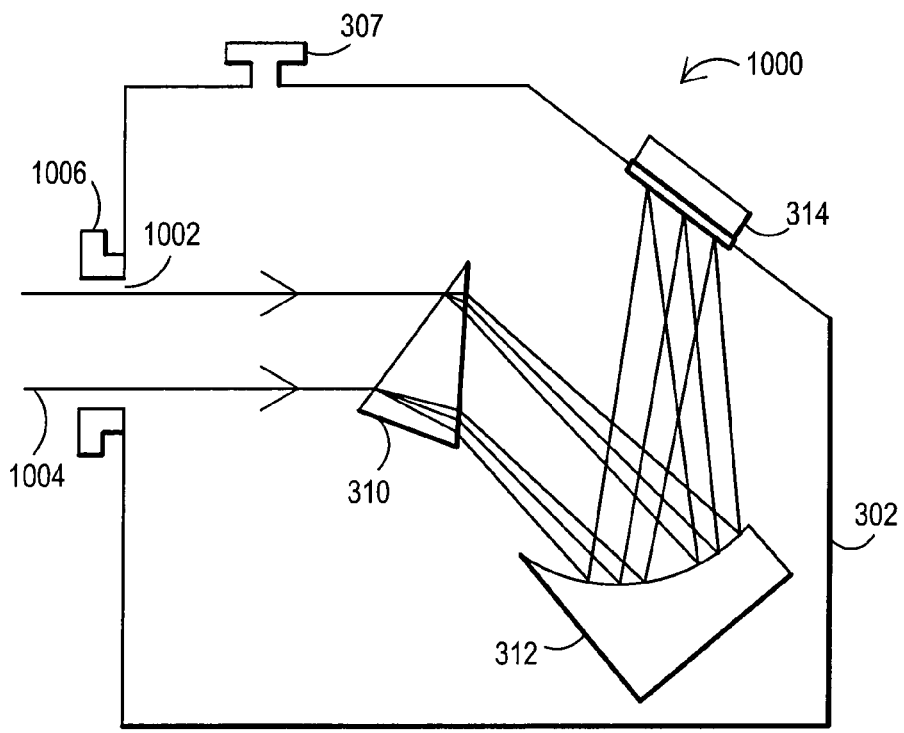
FIG. 10—Schematic representation of VUV spectrometer without entrance aperture.

In yet another embodiment, the spectrometer 1000 could be again similar to the spectrometer 300 of FIG. 3 except modified such that the entrance slit 304 and collimating optic 308 of FIG. 3 were removed. In this manner the instrument would readily lend itself to integration with existing optical systems, provided such systems presented the instrument with a collimated input beam. An example of this configuration is presented in FIG. 10. As shown in FIG. 10, a light entrance 1002 that is configured to receive a collimated input beam 1004 is provided. The collimated input beam 1004 is then provided to the prism 310 as shown.

As depicted in the figure, light enters the spectrometer 1000 through a vacuum fitting 1006 which connects the instrument to an existing optical system in a leak tight fashion. Collimated light 1004 entering the spectrometer is dispersed by the prism 310 and is collected and focused onto the detector array 314 by the focusing optic 312. Alignment of the spectrometer with the existing optical system is considerably more forgiving than in the embodiments of FIG. 3 or 6, owing to the collimated nature of the input beam. This follows since a small translational alignment error between the spectrometer and its input beam source will result in a negligible loss of signal using the configuration of FIG. 10, but could result in a significant loss of signal in the system of FIG. 3 or 6, where it is desirable to precisely align the focused input beam onto a small entrance aperture. Thus the alignment tolerance requirements between the spectrometer and the external light source would be lessened. This allows the spectrometer to be more easily integrated with other components of an optical metrology tool.

Figure 11:
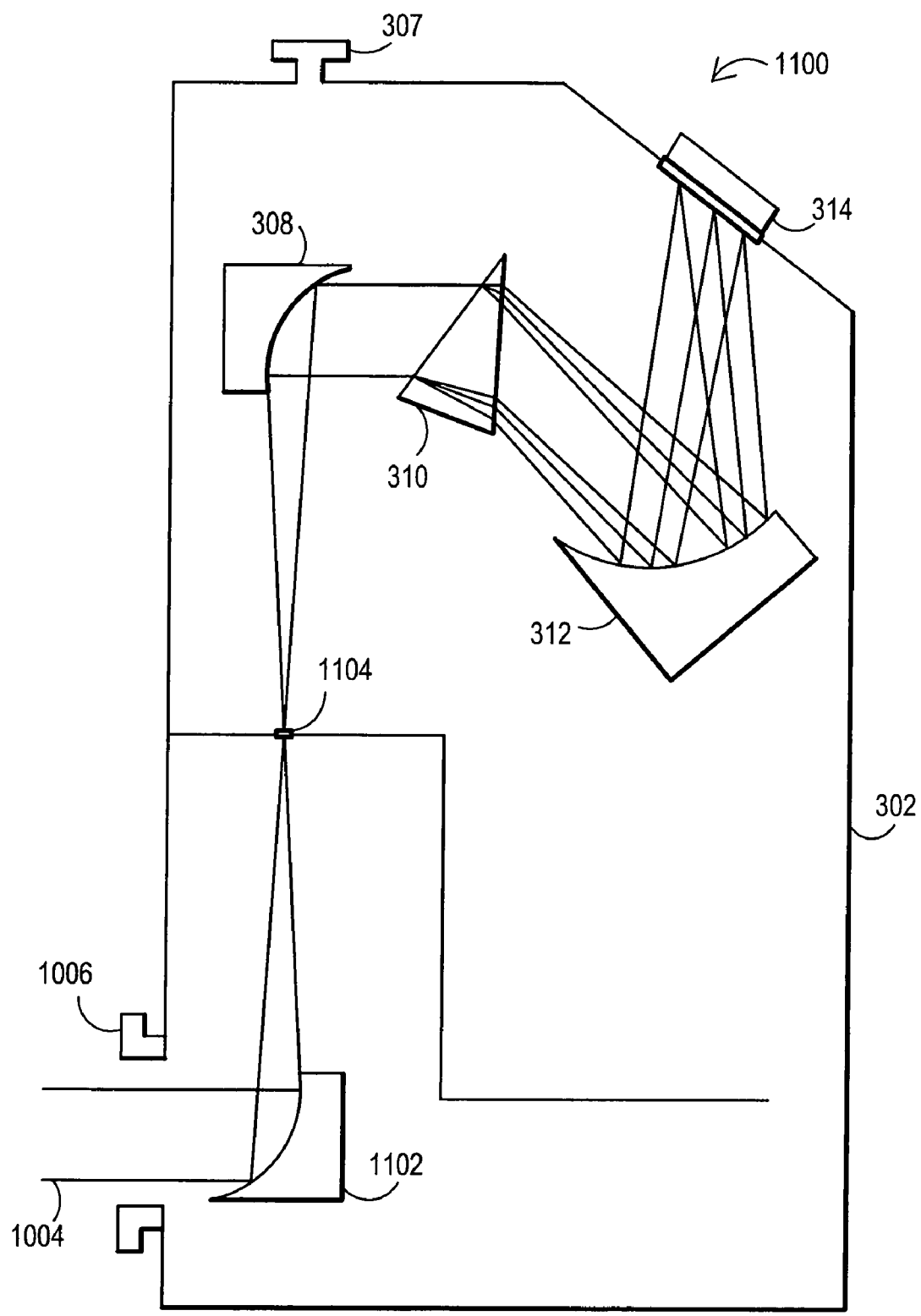
FIG. 11—Schematic representation of a VUV spectrometer with a collimated light entrance.

In yet another embodiment offering ease of alignment with an existing optical system, the spectrometer of FIG. 10 could also be equipped with a focusing optic and entrance aperture. An example of this embodiment is depicted in FIG. 11. This configuration provides greater control over the resolution and light gathering capabilities of the instrument, than does the instrument of FIG. 10, which relies on the characteristics of the optical system the spectrometer is coupled to, to define these properties.

Collimated light 1004 entering the instrument 1100 of FIG. 11 does so through a vacuum coupling 1006 which connects the spectrometer to an existing optical system similar to as shown in FIG. 10. The light is focused onto an entrance aperture 1104 by a first focusing optic 1102. In one embodiment of the instrument 1100 the first focusing optic is an off-axis parabolic reflector with a $MgF_2/Al$ overcoat optimized for operation in the VUV. Light passing through the entrance aperture 1104 is collected, collimated and directed towards the dispersing prism 310 by a collimating optic 308. Light dispersed by the prism 310 is collected by a second focusing optic 312 and focused on the surface of the detector 314 where it is detected. The spectrometer of FIG. 11 still provides for more forgiving alignment tolerances between the spectrometer and the external light source. Though alignment of the first focusing optic 1102 and the entrance aperture 1104 is required, because these elements are both formed within the spectrometer the alignment may be more easily controlled. Thus, FIG. 11 illustrates a use of an entrance aperture in which the alignment requirements between the spectrometer and the external light source are still less demanding.

In the situation where both the first focusing optic 1102 and the collimating optic 308 are off-axes parabolic mirrors it is noted that the relative orientation of the optics may be important. The rotationally symmetric configuration depicted in FIG. 11 is generally preferred over the alternate line symmetric configuration (wherein the mirrors are oriented so that they lie on the same parabolic surface) owing to the higher collection efficiency associated with the former arrangement.

Figure 12:
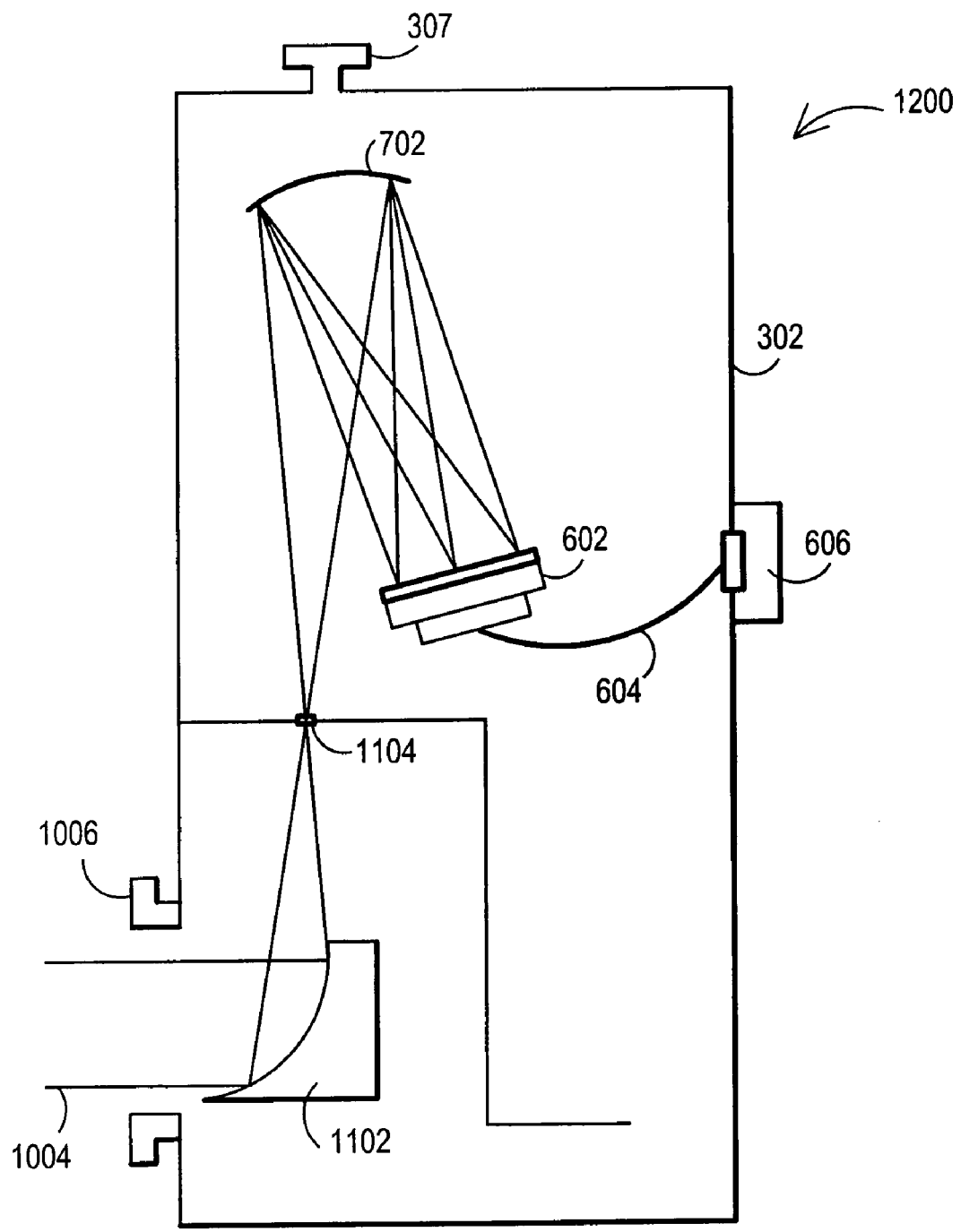
FIG. 12—Schematic representation of a grating based VUV spectrometer with a collimated light entrance.

It is noted that the VUV aberration-corrected grating instrument with internally-mounted detector, represented in FIG. 7, could also be configured with an additional focusing optic as depicted for the prism instrument of FIG. 11. Such a configuration is shown in FIG. 12. As shown in FIG. 12, the grating based spectrometer 1200 has collimated light 1004 entering the instrument through a vacuum coupling 1006 which connects the spectrometer to an existing optical system similar to as shown in FIG. 10. Similar to as shown in FIG. 11, the light of FIG. 12 is focused onto an entrance aperture 1104 by a first focusing optic 1102. Light passing through the entrance aperture 1104 then encounters an aberration-corrected flat-field imaging grating element 702. From the grating element 702 the light is directed toward an internally mounted detector element 602 to produce a compact VUV spectrometer 1200. Similar to FIGS. 6 and 7, the detector element 602 is coupled to its associated control electronics 606 through use of a vacuum compatible cable assembly 604.

In addition to providing improved optical throughput, relative to traditional VUV spectrometer designs, the techniques described herein offer the further benefit of producing a data set whose spectral information content better exploits the heightened measurement response often exhibited by samples when probed using vacuum ultra-violet spectroscopic techniques. In the specific case of reflectance measurements, shorter wavelength data in the VUV may often provide discriminating sensitivity to subtle changes in material properties, relative to data collected at longer wavelengths. This is direct consequence of the fact that the optical properties of many materials exhibit significantly more structure at shorter wavelengths in the VUV than at longer wavelengths. When collecting broad-band reflectance data sets it follows that there may be benefit in accumulating more data at shorter wavelengths in the VUV region and correspondingly less data at longer wavelengths. In this manner, the collected data set may provide a more sensitive indicator of subtle changes in the properties of the sample than traditional data sets characterized by linear dispersion.

To better illustrate this effect, the VUV reflectance spectrum of a 15 Å SiON film deposited on a silicon substrate is considered. Once collected, reduction of the measured data is generally accomplished using some form of the Fresnel equations in combination with one or more models to describe the optical properties of the materials comprising the sample. Typically the measured data set is compared to one calculated using an expression that depends on a set of parameters relating to the nature of the sample. The discrepancy between the measured and calculated data sets is minimized by iteratively adjusting the values of the parameters until such time as adequate agreement is achieved. This discrepancy is usually quantified in terms of a "goodness of fit" (GOF) parameter.

Figure 13:
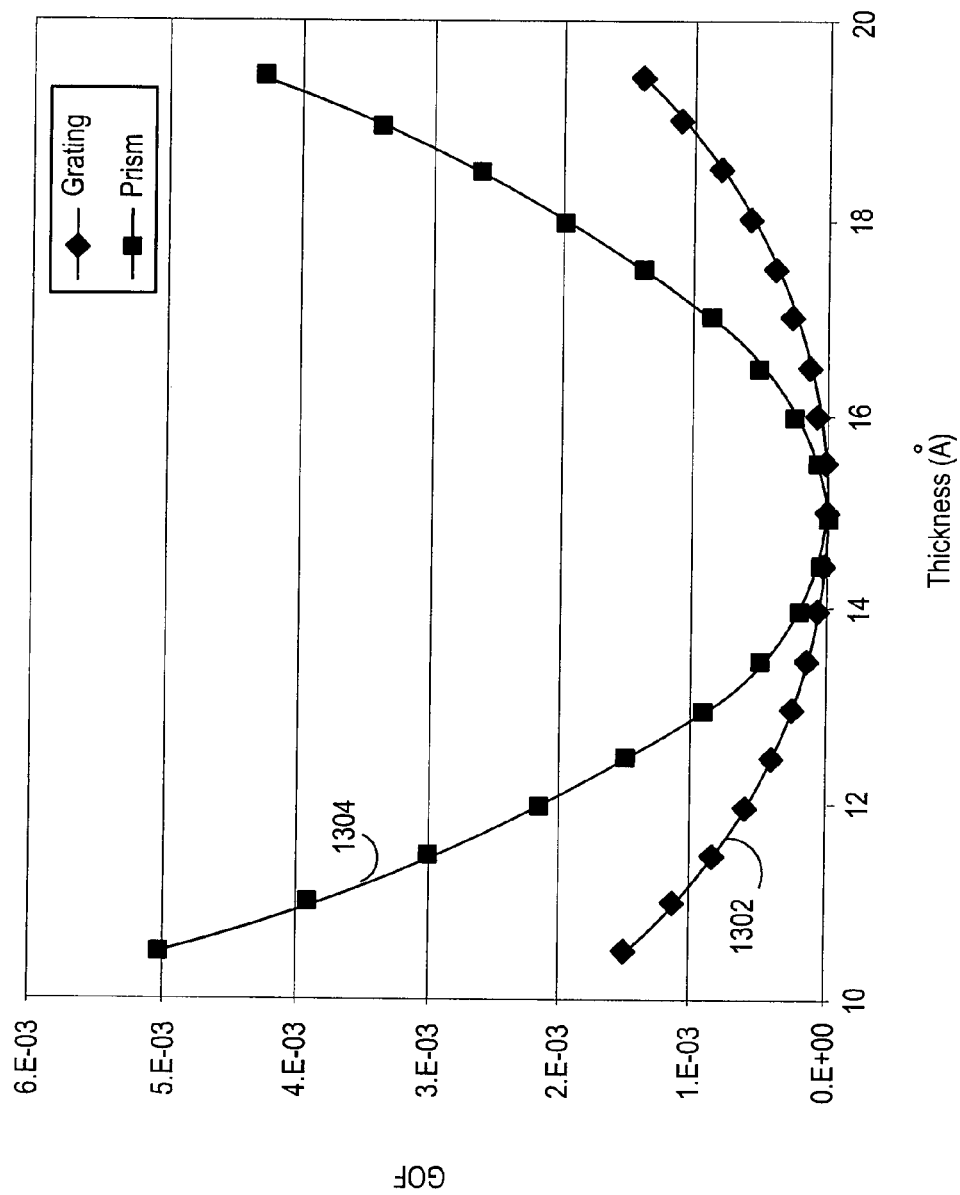
FIG. 13—Comparison of GOF versus thickness for reflectance data sets obtained with prism and grating based spectrometer designs. Results were obtained for a 15 Å SiON film deposited on Si using 1024 element detector.

FIG. 13 compares the value of the GOF parameter (as calculated for a series of thicknesses on and around the actual thickness of the film) for data sets collected using a grating spectrometer and the prism-based spectrometer in accordance with the techniques disclosed herein. Both spectrometers were equipped with 1024 element linear detector arrays. Plot 1302 illustrates the data for a grating based spectrometer and plot 1304 illustrates the data for a prism based spectrometer. As is evident in the figure, the value of the GOF parameter increases considerably faster as one moves away from the "true" thickness of the film for the data set associated with the prism based spectrometer, relative to that obtained with the grating instrument. This follows since SiON is more absorbing at shorter wavelengths and the prism spectrometer generates a data set wherein the short wavelength end of the measured spectrum is dispersed across a greater number of detector elements then does the grating spectrometer. As it is the slope of the GOF curve that ultimately drives the reduction process to its final result, the data set from the prism spectrometer will be capable of generating a more accurate result. Hence, the data set provided by the prism spectrometer may be considered to be more sensitive than its grating counterpart.

While the example of FIG. 13 relates to reflectance measurements performed on thin film samples, the enhanced spectral information content afforded by the current invention could also be employed in other VUV spectroscopic applications in order to provide improved measurement capabilities.

Thus the techniques described herein provide a variety of advantageous results. For example a compact, highly efficient means by which moderate resolution spectroscopy may be performed in the vacuum ultraviolet is described. More particularly, a VUV spectroscopy system well suited for reflectometry is provided for use in metrology applications. Further the concepts may be utilized in a high throughput prism spectrometer to spatially disperse wavelengths in and around the VUV in such a manner as to generate a substantially flat field focal plane, suitable for use with an array detector. Also, a spectroscopy system is provided which generates an output beam with spatially separated wavelength components. The system is designed so that the spectral resolution of the output beam closely matches the spectral information contained within the polychromatic input beam.

Thus as provided herein, a number of advantageous concepts are described. For example, prism and diffraction grating based spectrometers are provided. Further, different detector arrangements are described. In addition, different techniques in providing input light to the spectrometer are provided. It will be recognized that each of these concepts may be implemented singularly or in combination of one or more of the other concepts. Thus, the concepts and advantageous described herein need not all be utilized together in order to utilize one or more of the concepts described herein.

Moreover, though many of the techniques described herein have been described with regard to VUV wavelength applications, it will be recognized that the techniques are not limited to such wavelengths. Thus, the concepts described herein may be utilized in other regions of wavelengths including those less than or greater than the VUV region. Further, many of the advantageous described herein that particularly apply to the VUV region may also similarly apply to regions of wavelengths less than the VUV region.

The spectrometer techniques described herein may be utilized in a wide range of optical systems that would benefit from the use of a spectrometer. One such optical system is a reflectometer. For example, one particular type of reflectometer that these techniques may be utilized in is a VUV reflectometer. Examples of a VUV optical metrology instrument well suited to benefit from use of the methods herein described are disclosed in U.S. application Ser. No. 10/668,642, filed on Sep. 23, 2003, now U.S. Pat. No. 7,067,818; U.S. application Ser. No. 10/909,126, filed on Jul. 30, 2004, now U.S. Pat. No. 7,126,131; and U.S. application Ser. No. 11/600,413 filed on Nov. 16, 2006, the disclosures of which are all expressly incorporated herein by reference. The metrology instrument may be a broad-band reflectometer specifically designed to operate over a broad range of wavelengths, including the VUV.

Figure 14:
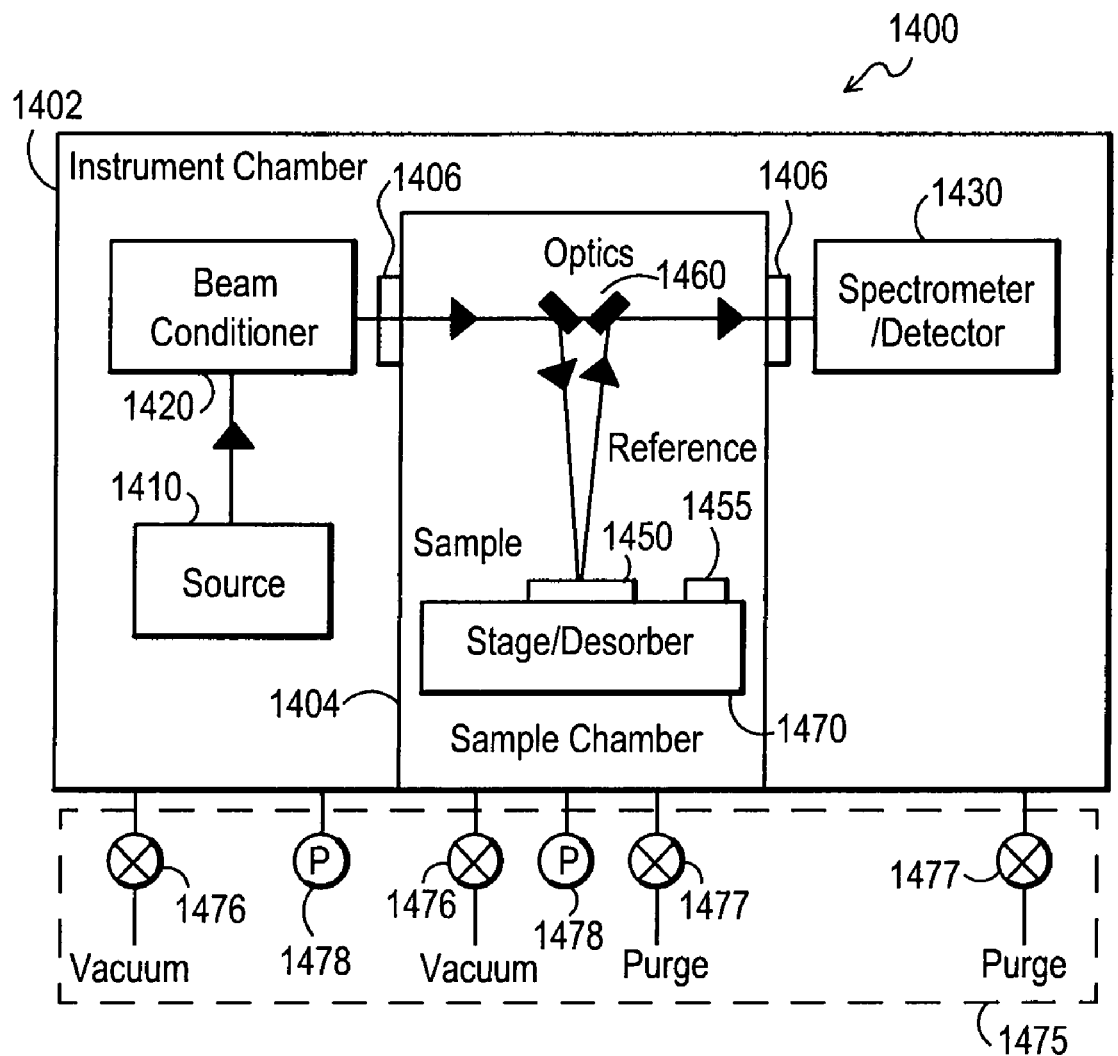
FIG. 14—Schematic representation of a reflectometer.
Figure 15:
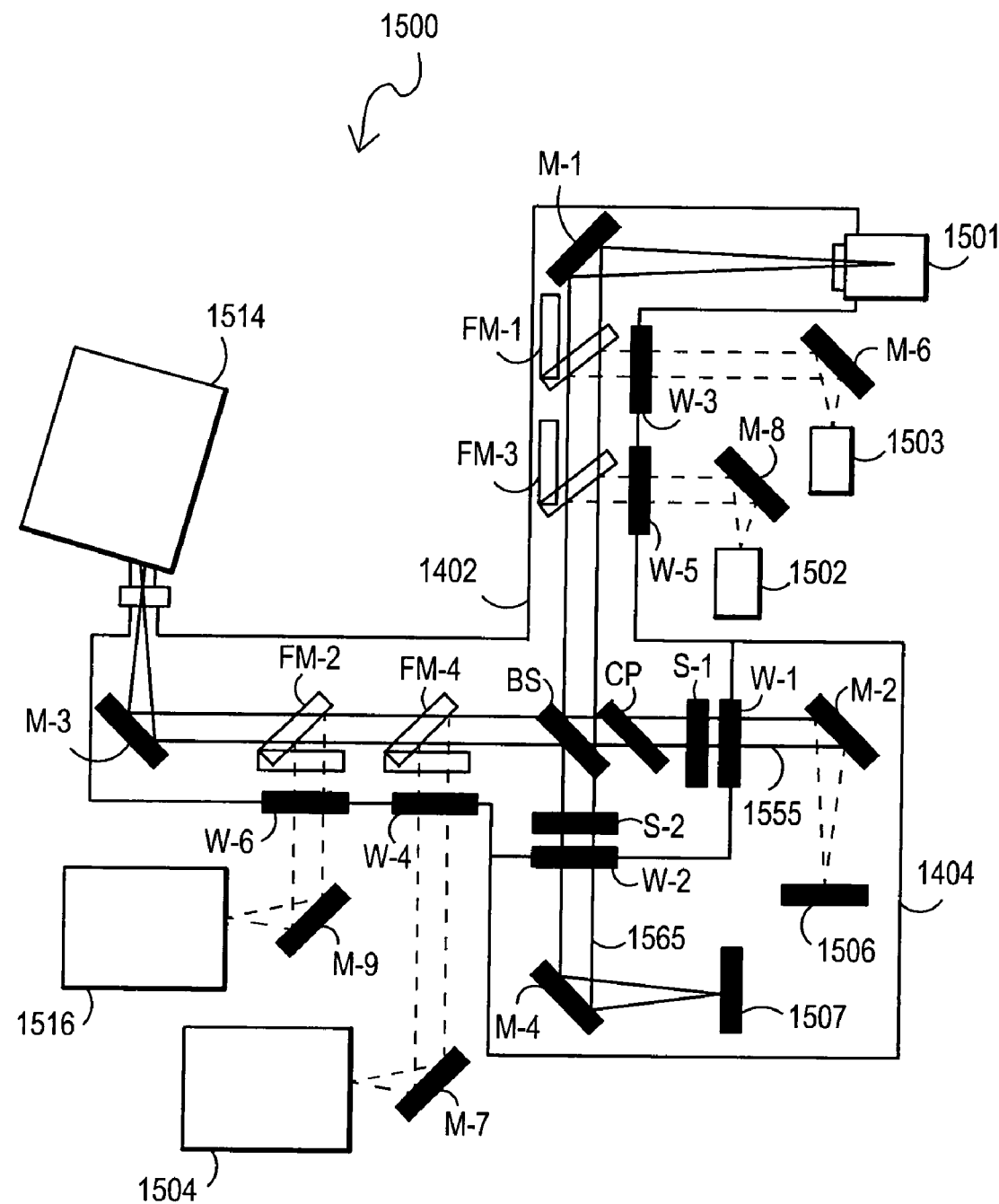
FIG. 15—Detailed schematic representation of a refleccto-meter.

An example of such an instrument 1400 is presented in FIG. 14. As is evident the source 1410, beam conditioning module 1420, optics (not shown), and spectrometer 1430 are contained within an environmentally controlled instrument (or optics) chamber 1402. The spectrometer 1430 may be configured as any one of the types of spectrometers described above. Though the reflectometers of FIGS. 14 and 15 are shown having non-collimated input light, it will be recognized that the light provided to the spectrometers may first be collimated prior to providing to the spectrometer so that the collimated input light techniques described above are also applicable for use with the reflectometers of FIGS. 14 and 15. The sample 1450, additional optics 1460, motorized stage/sample chuck 1470 (with optional integrated desorber capabilities) and reference sample 1455 are housed in a separate environmentally controlled sample chamber 1404 so as to enable loading and unloading of samples without contaminating the quality of the instrument chamber environment. The instrument and sample chambers are connected via a controllable coupling mechanism 1406 which permits the transfer of photons, and if so desired the exchange of gases to occur. Both the instrument chamber 1402 and sample chamber 1404 are connected to vacuum and purge sub-system 1475 that is complete with appropriate vacuum connections 1476, valves, purge connections 1477 and pressure gauges 1478 such that environmental control can be independently exercised in each chamber.

Additionally a processor (not shown) located outside the controlled environments may be used to coordinate and facilitate the automated monitoring methodologies and to analyze the measured data. It is recognized that the processor may be any of a wide variety of computing means that may provide suitable data processing and/or storage of the data collected.

While not explicitly shown in FIG. 14 it is noted that the system could be equipped with a robot and other associated mechanized components to aid in the loading and unloading of samples in an automated fashion, thereby further increasing measurement throughput. Further, as is known in the art load lock chambers may also be utilized in conjunction with the sample chamber to improve environmental control and increase the system throughput for interchanging samples.

In operation light from the source 1410 is modified, by way of the beam conditioning module 1420 and directed via delivery optics through the coupling mechanism 1406 and into the sample chamber 1404, where it is focused onto the sample 1450 by focusing optics 1460. Light reflected from the sample 1450 is collected by the focusing optics 1460 and re-directed out through the coupling mechanism 1406 where it is dispersed by the spectrometer 1430 and recorded by a detector which may have an array within the spectrometer or be coupled to the spectrometer as described above. The entire optical path of the device is maintained within controlled environments which function to remove absorbing species and permit transmission of VUV photons.

A more detailed schematic of the optical aspects of the instrument is presented in FIG. 15. The instrument is configured to collect referenced broad band reflectance data in the VUV and two additional spectral regions. In operation light from these three spectral regions may be obtained in either a parallel or serial manner. When operated in a serial fashion reflectance data from the VUV is first obtained and referenced, following which, reflectance data from the second and then third regions is collected and referenced. Once all three data sets are recorded they are spliced together to form a single broad band spectrum. In parallel operation reflectance data from all three regions are collected, referenced and recorded simultaneously prior to data splicing.

The instrument is separated into two environmentally controlled chambers, the instrument chamber 1402 and the sample chamber 1404. The instrument chamber 1402 houses most of the system optics and is not exposed to the atmosphere on a regular basis. The sample chamber 1404 houses the sample and sample and reference optics, and is opened regularly to facilitate changing samples. For example, the instrument chamber 1402 may include mirrors M-1, M-2, M-3, and M-4. Flip-in mirrors FM-1 and FM-3 may be utilized to selective chose which light source 1501, 1502 and 1503 is utilized (each having a different spectral region). Flip-in mirrors FM-2 and FM-4 may be utilized to selective chose one of spectrometers 1504, 1516, and 1514 (again depending upon the chosen spectral region). As with FIG. 14, the spectrometers 1504, 1516, and 1514 may utilized the techniques described above including the collimated input light. Mirrors M-6, M-7, M-8 and M-9 may be utilized to help direct the light beams as shown. Windows W-1 and W-2 couple light between the instrument chamber 1402 and sample chamber 1404. Windows W-3, W-4, W-5 and W-6 couple light into and out of the instrument chamber 1402. Beam splitter BS and shutters S-1 and S-2 are utilized to selectively direct light to a sample 1506 or a reference 1507 with the assistance of mirrors M-2 and M-4 as shown (the reference may be a mirror in one embodiment). The sample beam passes through compensator plate CP. The compensator plate CP is included to eliminate the phase difference that would occur between the sample and reference paths resulting from the fact that light traveling in the sample channel passes through the beam splitter substrate but once, while light traveling in the reference channel passes through the beam splitter substrate three times due to the nature of operation of a beam splitter. Hence, the compensator plate may be constructed of the same material and is of the same thickness as the beam splitter. This ensures that light traveling through the sample channel also passes through the same total thickness of beam splitter substrate material.

When operated in a serial fashion VUV data is first obtained by switching the second spectral region flip-in source mirror FM-1 and third spectral region flip-in source mirror FM-2 into the "out" position so as to allow light from the VUV source to be collected, collimated and redirected towards beam splitter element BS by the focusing mirror M-1. Light striking the beam splitter is divided into two components, the sample beam 1555 and the reference beam 1565, using a near-balanced Michelson interferometer arrangement. The sample beam is reflected from the beam splitter BS and travels through the compensator plate CP, sample shutter S-1 and sample window W-1 into the sample chamber 1404, where it is redirected and focused onto the sample 1506 via a focusing mirror M-2. The reference shutter S-2 is closed during this time. The sample window W-1 is constructed of a material that is sufficiently transparent to VUV wavelengths so as to maintain high optical throughput.

Light reflected from the sample is collected, collimated and redirected by the sample mirror M-2 back through the sample window, where it passes through the sample shutter and compensator plate. The light then continues on unhampered by the first spectral region flip-in detector mirror FM-2 and the second spectral region flip-in detector mirror FM-4 (switched to the "out" position), where it is redirected and focused onto the entrance slit of the VUV spectrometer 1514 by the focusing mirror M-3. At this point light from the sample beam is dispersed by the VUV spectrometer and recorded by its associated detector.

Following collection of the sample beam, the reference beam is measured. This is accomplished by closing the sample shutter S-1 and opening the reference shutter S-2. This enables the reference beam to travel through the beam splitter BS, reference shutter S-2 and reference window W-2 into the sample chamber 1404, wherein it is redirected and focused by mirror M-4 onto the plane reference mirror 1507 which serves as the reference. The reference window is also constructed of a material that is sufficiently transparent to VUV wavelengths so as to maintain high optical throughput.

Light reflected from the surface of the plane reference mirror 1507 travels back towards the focusing reference mirror M-4 where it is collected, collimated and redirected through the reference window W-2 and the reference shutter S-2 towards the beam splitter BS. Light is then reflected by the beam splitter towards the focusing mirror M-3 where it is redirected and focused onto the entrance slit of the VUV spectrometer 1514. The path length of the reference beam 1565 may be specifically designed so as to match that of the sample beam 1555 in each of the environmentally controlled chambers.

Following measurement of the VUV data set, the second spectral region data set is obtained in a similar manner. During collection of the second region spectral data both the second spectral region source flip-in mirror FM-1 and the second spectral region detector flip-in mirror FM-2 are switched to the "in" position. As a result, light from the VUV source 1501 is blocked and light from the second spectral region source 1503 is allowed to pass through window W-3, after it is collected, collimated and redirected by its focusing mirror M-6. Similarly, switching the second spectral region detector flip-in mirror FM-2 into the "in" position directs light from the sample beam (when the sample shutter is open and the reference shutter is closed) and reference beam (when the reference shutter is open and the sample shutter is closed) through the associated window W-6 and onto the mirror M-9 which focuses the light onto the entrance slit of the second spectral region spectrometer 1516, where it is dispersed and collected by its detector.

Data from the third spectral region is collected in a similar fashion by flipping "in" the third spectral region source flip-in mirror FM-3 and the third spectral region detector flip-in mirror FM-4, while flipping "out" the second spectral region source flip-in mirror FM-1 and the second spectral region detector flip-in mirror FM-2.

Once the sample and reference measurements for each of the spectral regions have been performed a processor (not shown) can be used to calculate the referenced reflectance spectra in each of the three regions. Finally, these individual reflectance spectra are combined to generate a single reflectance spectrum encompassing the three spectral regions.

When operated in a parallel mode, the source and detector flip-in mirrors are replaced with appropriate beam splitters so that data from all three spectral regions are recorded simultaneously.

The systems of FIG. 14 and FIG. 15 may be utilized as stand-alone tools or may be integrated with another process tool. In one embodiment, the systems of FIG. 14 and FIG. 15 may be merely attached to a process tool with some mechanism that allows for transport of the sample between the process tool and the metrology tool sample chamber. In another alternative, the sample chamber may be constructed in a manner that it is shared within the process tool such that the metrology tool and the process tool may be more tightly integrated together. For example the instrumentation/optics chamber may communicate with a sample chamber that is formed with a process tool through the use of a window, gate valve or other coupling mechanism. In this manner the sample need not leave the environment of the process tool, rather the sample may be contained within a region of the process tool such as a processing chamber, a transport region or other region within the process tool.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as presently preferred embodiments. Equivalent elements may be substituted for those illustrated and describe herein and certain features of the invention may be utilized independently of the use of other features, all as would be apparent to one skilled in the art after having the benefit of this description of the invention.

What is claimed is:

1. A spectrometer, comprising:
   at least one optical element which receives light and separates the light such that different wavelengths of the light are spatially separated; and
   an array detector located within a controlled environment and positioned at a focal plane of the different spatially separated wavelengths of light so as to detect the different spatially separated wavelengths of light, the array detector being adjustable to facilitate alignment of the array detector with respect to the focal plane.

2. The spectrometer of claim 1, wherein the array detector is contained within a chamber of the spectrometer.

3. The spectrometer of claim 1, wherein adjustment of the position of the array detector does not change a volume of the controlled environment.

4. The spectrometer of claim 3, wherein the array detector is coupled to detector electronics which are located outside the controlled environment.

5. The spectrometer of claim 3, wherein an environment of the spectrometer is sufficiently controlled to allow for transmission and detection of wavelengths below deep UV wavelengths.

6. The spectrometer of claim 1, wherein the optical element is a prism.

7. The spectrometer of claim 1, wherein the optical element is a diffraction grating.

8. The spectrometer of claim 1, wherein the light received by the optical element includes wavelengths below deep UV wavelengths of light.

9. The spectrometer of claim 1, wherein the light received by the optical element is collimated.

10. The spectrometer of claim 9, wherein the collimated light received by the optical element includes wavelengths below deep UV wavelengths of light.

11. The spectrometer of claim 1, wherein the array detector is coupled to detector electronics which are located outside the controlled environment.

12. A spectrometer, comprising:
    a light path that includes at least one optical element;

an adjustable array detector positioned at a focal plane of the light path, the adjustable array detector being located at a point in the light path that is subsequent to the at least one optical element, the adjustable array detector detecting light provided at the focal plane, the array detector being adjustable to facilitate alignment of the array detector with respect to the focal plane; and an enclosed volume within the spectrometer, the enclosed volume fully surrounding the adjustable array detector.

13. The spectrometer of claim 12, wherein the adjustable array detector is coupled to detector electronics which are located outside the enclosed volume of the spectrometer.

14. The spectrometer of claim 13, wherein the enclosed volume of the spectrometer is sufficiently controlled to allow for transmission and detection of wavelengths below deep UV wavelengths.

15. The spectrometer of claim 12, wherein the enclosed volume of the spectrometer is sufficiently controlled to allow for transmission and detection of wavelengths below deep UV wavelengths.

16. The spectrometer of claim 15, wherein light received by the optical element is collimated.

17. The spectrometer of claim 16, wherein the optical element is a prism.

18. The spectrometer of claim 16, wherein the optical element is a diffraction grating.

19. The spectrometer of claim 12, wherein light received by the optical element includes wavelengths below deep UV wavelengths of light.

20. The spectrometer of claim 12, wherein light received by the optical element is collimated.

21. The spectrometer of claim 20, wherein the collimated light is collimated within the spectrometer.

22. The spectrometer of claim 20, wherein the collimated light is collimated external to the spectrometer.

23. A spectrometer for processing wavelengths of light that includes wavelengths below deep UV wavelengths, comprising:

at least one optical element which receives light which includes wavelengths below deep UV wavelengths, the optical element spreading the light as multiple spatially separated wavelengths of light; and an adjustable array detector that simultaneously receives the multiple spatially separated wavelengths of light, the adjustable array detector being movable so that the adjustable array detector may be aligned with respect to the multiple spatially separated wavelengths of light, wherein the adjustable array detector is contained within an enclosed chamber of the spectrometer and wherein adjustment of the position of the adjustable array detector does not change a volume of the enclosed chamber.

24. The spectrometer of claim 23, wherein the adjustable array detector is coupled to detector electronics which are located outside the enclosed chamber of the spectrometer.

25. The spectrometer of claim 23, wherein the optical element is a prism.

26. The spectrometer of claim 23, wherein the optical element is a diffraction grating.

27. The spectrometer of claim 23, wherein the light received by the optical element is collimated.

28. The spectrometer of claim 23, wherein the spectrometer is configured to receive light collimated external to the spectrometer.

29. A method of operating a spectrometer so that an array detector may be aligned with respect to a light path within the spectrometer, comprising:

providing an interior space within the spectrometer, the light path being at least in part within the interior space, the interior space being sufficiently environmentally controlled to allow for the transmission and detection of wavelengths of light that include at least in part wavelengths below deep UV wavelengths; and adjusting the position of the array detector with respect to a focal plane of the light path, wherein the adjustment of the position of the array detector does not alter a volume of the space.

30. The method of claim 29, further comprising:

coupling the array detector to detector electronics, the detector electronics being located outside of the interior space.

31. The method of claim 30, wherein a prism is located within the light path.

32. The method of claim 31, wherein light received by the prism is collimated.

33. The method of claim 30, wherein a diffraction grating is located within the light path.

34. The method of claim 33, wherein the spectrometer is configured to receive light collimated external to the spectrometer.

* * * * *